T. L. FYFFE.
COLLAR OR THE LIKE FOR JOINING HARD METAL PIPES.
APPLICATION FILED MAY 5, 1920.

1,426,724.

Patented Aug. 22, 1922.

INVENTOR:
Thomas Lillie Fyffe
By Wm Wallace White
ATTY.

UNITED STATES PATENT OFFICE.

THOMAS LILLIE FYFFE, OF DUNDEE, SCOTLAND.

COLLAR OR THE LIKE FOR JOINING HARD-METAL PIPES.

1,426,724.   Specification of Letters Patent.   Patented Aug. 22, 1922.

Application filed May 5, 1920.   Serial No. 378,986.

*To all whom it may concern:*

Be it known that I, THOMAS LILLIE FYFFE, of Dundee, in the county of Forfar, Scotland, a subject of the King of Great Britain and Ireland, have invented certain new and useful Improvements in Collars or the like for Joining Hard-Metal Pipes, of which the following is a specification.

This invention relates to collars or the like for joining hard metal pipes. The object of this invention is to provide an improved collar for this purpose.

A collar made in accordance with this invention is flared or swelled at one end and adapted to coact with an internal core of hard metal, a seating of copper or other soft metal being disposed between the collar and the core. Means are provided for drawing the collar towards the core. The other end of the collar may be joined to the metal pipe by threaded, flanged, socket or other joint.

Referring to the drawing filed herewith:—

Figure 1:
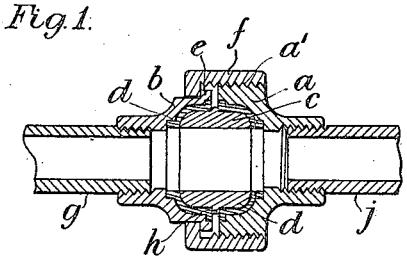
Fig. 1 is a section of a joint made in accordance with this invention connecting two pipes of the same diameter by threaded connections on the collars. The collars being provided with spherical shaped recesses.
Figure 2:
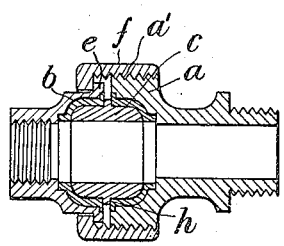
Fig. 2 is a section showing a joint, one collar having a flange and external screw to connect it to any existing fitting.
Figure 3:
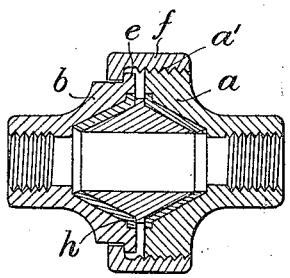
Fig. 3 is a section showing a joint, the collar being provided with coned shaped recesses.

$a$ and $b$ are two collars each swelled at one end, $c$ is an internal core of hard metal, $d\ d$ are seatings of soft metal disposed between the collars and the core. The collar $a$ is threaded at $a'$ and the collar $b$ is provided with a flange $e$. A coupling ring $f$ is adapted to draw the two collars $a$ and $b$ towards one another so as to grip the soft metal seating $d$ between the collars and the core. The pipes $g$ and $j$ may be connected to the collars by threads or in any well known manner. The core is preferably provided with a central rib or stop $h$. The surface of the core and corresponding swelled surface of the collars are shown spherical in Figs. 1 and 2, and though this is considered preferable they may be conical as shown in Fig. 3.

In use the collars are connected to the pipes or fittings to be joined, the core is then placed between the collars with soft metal seatings between the core and the collars, the coupling ring is then placed in position and screwed up so as to draw the collars towards one another and grip the soft metal seating between the core and the collars, the soft metal seating taking a bearing against the central rib.

With a coupling made in accordance with this invention an effective joint for hard metal pipes capable of standing high pressures can be made.

What I claim and desire to secure by Letters Patent is:—

Means for joining two hard metal pipes comprising a pair of collars each flared or swelled at one end, means for securing the collars to the pipes to be joined, a hollow hard metal core adapted to lie in the swelled ends of the collars, a seating of soft metal adapted to lie between the collars and the core, means for drawing the collars towards one another so as to grip the seating between the collars and core, said core being provided with a central rib the internal surface of the collars and the external surface of the core being spherical in form.

In testimony whereof I have signed my name to this specification.

THOMAS LILLIE FYFFE.